United States Patent [19]
Morrisey

[11] 3,901,281
[45] Aug. 26, 1975

[54] AIRCRAFT FUEL LINE
[75] Inventor: Edward J. Morrisey, Dayton, Ohio
[73] Assignee: The United States of America as represented by the Secretary of the Air Force, Washington, D.C.
[22] Filed: Dec. 27, 1972
[21] Appl. No.: 319,084

[52] U.S. Cl. .............. 138/140; 138/153; 220/63 A
[51] Int. Cl.² ......................................... F16L 9/14
[58] Field of Search ............ 138/97, 140, 143, 153; 220/63 A

[56] References Cited
UNITED STATES PATENTS

| | | | |
|---|---|---|---|
| 2,308,342 | 1/1943 | Wilkinson et al. | 138/133 |
| 2,429,688 | 10/1947 | Hoover | 220/63 A |
| 2,601,525 | 6/1952 | Howald et al. | 220/63 A |
| 2,715,085 | 8/1955 | Boger | 220/63 A |
| 3,563,846 | 2/1971 | Harr | 220/63 A |
| 3,698,587 | 10/1972 | Baker et al. | 220/63 A |
| 3,830,261 | 8/1974 | Hochberg | 138/141 |

Primary Examiner—Herbert Goldstein
Attorney, Agent, or Firm—Joseph E. Rusz; Cedric H. Kuhn

[57] ABSTRACT

A fuel line is provided that comprises a metallic tube, a resin-impregnated reinforcing fiber or yarn covering the tube, a polymeric foam material covering the reinforcing fiber or yarn, a resin-impregnated reinforcing fiber or yarn covering the foam material, and a self-sealing material covering the last-mentioned reinforcing fiber or yarn.

8 Claims, 3 Drawing Figures

AIRCRAFT FUEL LINE

RIGHTS OF THE GOVERNMENT

The invention described herein may be manufactured and used by or for the Government of the United States for all governmental purposes without the payment of any royalty.

FIELD OF THE INVENTION

This invention relates to an improved fuel line which is particularly useful for military aircraft.

BACKGROUND OF THE INVENTION

Fuel lines for combat military aircraft are conventionally constructed of a thin wall metal, such as aluminum, which is covered with a self-sealing material. When such a fuel line is struck by a high velocity projectile, the metal flowers, i.e., metal segments open up like the petals of a flower, as the projectile passes through the line. The flowering of the metal makes it necessary to increase the thickness of the self-sealing material an amount equal to the space between the metal segments and the surface of the fuel line. This is the case since the effective thickness of the self-sealing material is only that portion which is anterior to the extremities of the flowered metal. Thus, the amount of the self-sealing material between the metal segments and the surface of the fuel line is substantially wasted in that it does not perform its intended function.

In addition to the flowering effect, a projectile in passing through a thin wall, metal tube often causes generally longitudinal splits to occur. These splits in the tube usually extend outwardly from the exit opening in the tubing that is caused by the projectile. Splits in the fuel line greatly decrease its strength so that it may rupture, causing fuel loss and the danger of fire.

It is an object of this invention, therefore, to provide an improved fuel line for use in military aircraft.

Another object of the invention is to provide a fuel line in which flowering of metal caused by passage of a projectile therethrough is substantially reduced.

A further object of the invention is to provide a fuel line of increased strength, thereby decreasing or eliminating the possibility of fuel line rupture.

Still another object of the invention is to provide a fuel line which makes possible the more efficient use of self-sealing material.

Other objects and advantages of the invention will become apparent to those skilled in the art upon consideration of the accompanying disclosure and the drawing in which.

SUMMARY OF THE INVENTION

The present invention resides in a fuel line that comprises a thin wall tubular member, a cured resin-coated reinforcing material wound on the tubular member, a foamed plastic material covering the reinforcing material, a cured resin-coated reinforcing material wound on the foamed plastic material, and a self-sealing material covering the last mentioned reinforcing material. While the aforementioned elements define the essential structure of the fuel line, in actual use the self-sealing material is encompassed by a layer of a protective material covered with a coating composition. The fuel line of this invention has a structure which eliminates or at least reduces the flowering effect and removes or alleviates the danger of line rupture when penetrated by high velocity projectiles.

Figure 1:
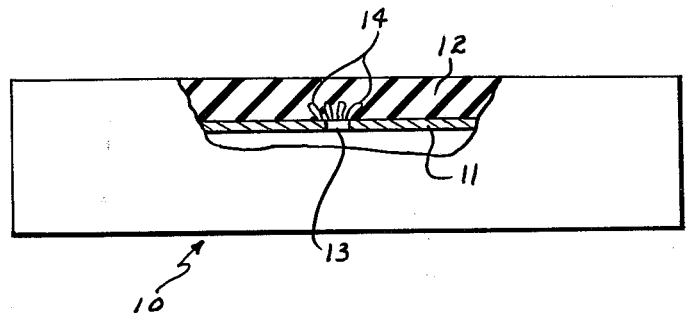
FIG. 1 is an elevational view, partly in section, of a conventional fuel line, illustrating the flowering effect caused by passage of a projectile therethrough.

Reference is now made to the drawing for obtaining a more complete understanding of the invention. Before describing the fuel line of this invention, a further discussion of the problem involved is considered to be necessary and desirable. Thus, referring to FIG. 1, an elevational view, partly in section, is shown of fuel line 10 of a type that is conventionally used in military aircraft. Fuel line 10 comprises a thin wall metal tube 11 which is covered by layer 12 of a self-sealing material. The self-sealing material is generally covered with a protective layer of material which for the sake of simplicity has been omitted. As depicted in FIG. 1, a projectile has passed through the line, causing metal of tube 11 to flower from opening 13 into a plurality of segments 14.

Figure 2:
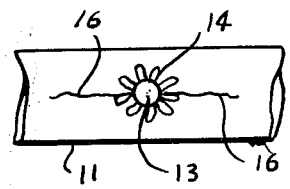
FIG. 2 is a partial plan view of a conventional fuel line, illustrating the flowering effect and splits in the line caused by passage of a projectile therethrough.

The flowering effect produced by the projectile in passing through tube 11 is also illustrated in FIG. 2 which is a plan view of the fuel line of FIG. 1 with the self-sealing material removed from the tube. Also shown in FIG. 2 are cracks 16 extending from opening 13 that are caused by passage of the projectile through the tube. The occurrence of the cracks weakens tube 11 and in some cases may be of such magnitude as to cause the tube to burst. In addition to causing loss of fuel, the likelihood of fire occurring presents an even greater hazard.

As segments 14 open outwardly, self-sealing material is moved away from the space above opening 13 bounded by segments 14. Since the space is substantially free of self-sealing material, fuel escaping through opening 13 first encounters that material at a distance above the inner wall of tube 11 equal to that of the height of the segments above the wall. Thus, the thickness of self-sealing material which is effective in performing its function is descreased by the aforementioned height of the segments. As a result, it is necessary with conventional fuel lines to increase the thickness of the coating of self-sealing material in order to obtain a desired sealing effect. The amount of the increase in thickness will depend upon the caliber of the projectile that the aircraft may encounter, i.e., the larger the caliber the greater the increase. The added weight resulting from the presence of the ineffective self-sealing material is very undesirable from the standpoint of military aircraft design.

Figure 3:
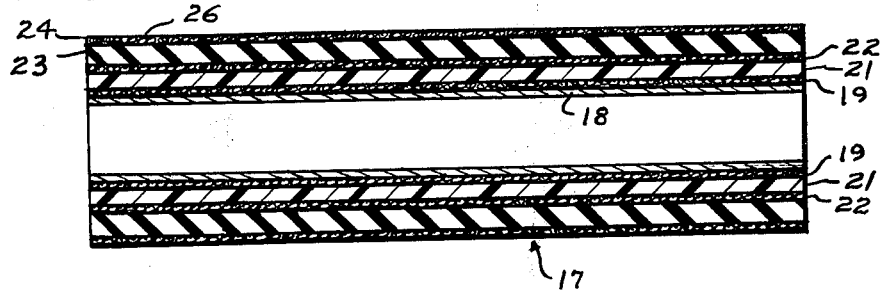
FIG. 3 is an elevational view, in section, showing the fuel line of the present invention.

Referring now to FIG. 3, there is illustrated the fuel line 17 of this invention that overcomes the above-discussed disadvantages of conventional fuel lines. Fuel line 17 includes a thin wall metal tube 18 which is often fabricated from aluminum. However, it is to be understood that the tube can be made from other metals such as stainless steel or titanium. Wound around tube 18 is a reinforcing material 19 which is impregnated with a thermosetting resin.

Examples of suitable reinforcing materials include glass, quartz, carbon and graphite fibers and yarns. Any suitable thermosetting resin, of which there are many described in the literature, can be utilized. It is often preferred to employ epoxy resins, a particularly useful one being the condensation product of an epihalohydrin and a polyhydric phenol, e.g., epichlorohydrin and bisphenol A(4,4'-isopropylidenephenol). Other suitable polyepoxides include the condensation products of epihalohydrins and a polyhydric alcohol such as ethylene glycol, propylene glycol, and the like. The epoxy resins can be hardened by the use of hardening or crosslinking agents such as amines or anhydrides.

Other examples of thermosetting resins that can be employed include phenolic resins prepared by reaction of phenol and formaldehyde; polyimide resins formed by the condensation of an aromatic tetrabasic acid anhydride and an aromatic diamine; polybenzimidazole resins formed by the reaction of an aromatic tetraamine with an aromatic diacid; pyrrone resins prepared by the condensation of an aromatic dianhydride and an aromatic tetraamine; and the like.

The reinforcing material can be impregnated with the thermosetting resin either prior to or after the winding operation. In a preferred embodiment, the reinforcing material is initially passed through a bath consisting of a solution of the thermosetting resin. Solvents useful for preparing a solution of a particular thermosetting resin are well known and include alcohols such as propanol and butanol, ketones such as acetone and methyl ethyl ketone, dimethylformamide, dimethylsulfoxide, N-methylpyrrolidone, dimethylacetamide, and the like. The solution usually contains in the range of about 25 to 80 weight percent of the thermosetting resin. In its passage through the solution, the reinforcing material generally picks up in the range of 20 to 60 weight percent of the resin, based upon the weight of the reinforcing material. The amount of thermosetting resin "pick up" can be controlled by varying the resin concentration and the length of the path of travel in the resin solution. An alternative procedure of impregnation is to paint or spray the resin solution on the reinforcing material after it has been wound on metal tube 18. With some resin systems, it is possible to apply the resin without the use of a solvent, particularly when using a brush to apply the resin.

Reinforcing material 19 in the form of a filament or yarn, e.g., glass fiber rovings, either resin impregnated or initially non-impregnated according to the procedure to be followed as described above, can be helically wound onto tube 18 with the windings in contact with one another. While a single layer of the reinforcing material is generally adequate, it is within the scope of the invention to have more than one layer of helical windings. In the latter case the helical windings of each successive layer are oriented at a different angle with respect to the longitudinal axis of tube 18. When resin impregnation is carried out subsequent to the winding operation, resin is applied upon each layer of helical windings as it is completed. In a preferred embodiment, reinforcing material 19 is braided onto tube 18 so as to provide multi-crossover wrappings or windings. Machines capable of helically winding or braiding filament or yarn onto a metal tube are described in the literature.

After the resin-impregnated reinforcing material is in place on tube 18, the resin is subjected to conditions whereby it is cured. In some cases curing can be affected by merely exposing the resin to atmospheric conditions. However, it is usually preferred to heat the tube with its resin-impregnated windings at a temperature ranging from about 150° to 450°F for a period of about 1 to 8 hours. The actual curing conditions used will depend upon the particular resin employed to impregnate the reinforcing material.

Encompassing the windings of reinforcing material 19 is a layer of a foamed polymeric material. A low density, flexible foam in sheet form that can be wrapped around the windings is preferably employed. However, it is within the purview of the invention to foam a polymer in place around the windings, utilizing well known techniques. Examples of foamed material that can be used include polyvinyl chloride foam, polyurethane foam, polypropylene foam, and the like. It is often preferred to employ polypropylene foam.

The thickness of the foam material will vary and to a certain extent is dependent upon the caliber of the projectile against which the fuel line is designed to protect. Thus, theoretically the thickness should be equal to the height of metal segments 14 above the outer surface of tube 11 as shown in FIG. 1. In other words the foam thickness would be equal to the layer of self-sealing material 12 of FIG. 1 that is ineffective in performing its intended function. As a practical matter, however, the foam thickness can be considerably less since the flowering effect is lessened to a considerable degree as a result of the windings of reinforcing material 19. Also, because the foam material absorbs at least partially the force of impact of the projectile, distortion of the metal wall of the tube is decreased. Thus, the two elements, i.e., the windings and the foam material, cooperate to lessen or eliminate flowering as well as cracks in the wall of the tube. Generally the foam material has a thickness ranging from about 0.25 to 0.50 inch.

The layer of foam material 21 is held in place on the first layer of windings of reinforcing material 19 by a second layer of resin impregnated reinforcing material 22. The reinforcing material as well as the resin impregnant of the second layer can be the same as used in the first layer, and it can be applied in the same manner as previously described. While the primary function of the second layer is to hold the foam material in place, it also adds strength to the fuel line structure. Furthermore, since the foam material is confined between the two layers of reinforcing material, the ability of the foam to prevent flowering is increased.

A covering or layer of self-sealing material 23 is positioned around the second layer of reinforcing material 22. Suitable self-sealing materials are described in the literature. Generally polymeric materials, which are elastomeric and swell upon contact with a hydrocarbon, are utilized. As a result of the swelling action, an opening in a fuel line caused by passage of a projectile therethrough is closed by the expanded elastomeric material. Examples of polymers that can be used include silicone polymers, natural rubber, polybutadiene, polyisoprene, and the like. The polymer is applied when in a partially cured state since its tendency to swell as a result of fuel absorption is greatest when in that state. To reinforce the polymer, wire, fibers, or fabric is generally incorporated in the polymer. The thickness of the layer of self-sealing material 23 depends to a large extent upon the caliber of the projectile which the fuel line may be expected to encounter. For example, a greater thickness is required for a 20 mm than a 0.50 caliber projectile. Another factor influencing the thickness of the layer of the self-sealing material is the ability of that material to absorb fuel so that swelling thereof will close the opening caused by the projectile. In order to conserve weight, the thickness of the self-sealing material is preferably about equal to that which is actually required to meet design requirements. Generally the thickness of the self-sealing material ranges from about 0.25 to 0.75 inch.

An important advantage of the fuel line of this invention accrues from the elimination of the ineffective layer of self-sealing material present in conventional fuel lines and the substitution therefor of a layer of light weight foam material. As a result it is possible to increase the thickness of the layer of effective self-sealing material without a substantial increase in weight as compared to a conventional fuel line while concomitantly rendering the fuel line of this invention suitable for use against higher caliber projectiles.

A protective layer of a fiber, yarn or tape 24 covers selfsealing material 24. This outer layer may be in the form of hoop or helical windings, and any suitable fibers or tape formed of a material such as nylon, rayon, or asbestos may be utilized. In order to provide a smooth, impervious surface, the windings of fiber, yarn or tape are provided with a protective coating 26. As a protective coating, it is usually preferred to utilize urethane varnish although other types of coating materials, e.g., those based on alkyl resins, can be used.

A more complete understanding of the invention can be obtained by referring to the following illustrative example which is not intended, however, to be unduly limitative of the invention.

EXAMPLE

A fuel line according to the present invention was prepared, utilizing a 3.5 inch diameter aluminum tube having a wall thickness of about 0.060 inch and a length of about 2 feet. The tube was fed through a braiding machine, thereby braiding onto the tube a layer of glass fiber rovings. The dry glass fiber windings were then impregnated with epoxy resin by applying the resin with a brush. The tube with its layer of resin-impregnated glass fiber windings was then placed in an oven wherein it was heated for 2 hours at 250°F. As a result of this heating step, the epoxy resin was cured. The layer of resin-impregnated glass fiber windings was then covered with a ¼ inch layer of polyvinyl chloride foam. The foam layer was next covered with a layer of braided glass fiber rovings that was similar to the layer mentioned above. This second layer of glass fiber windings was impregnated with an epoxy resin according to the procedure followed with regard to the first layer. A self-sealing material was not applied over the second layer in order that the effect on the fuel line of the gunfire test to be described in the next paragraph could be observed.

The fuel line tube fabricated as described in the preceding paragraph was then filled with water which was maintained under a pressure of 30 psi. This pressure is at least as great as that which the tube would encounter under actual use conditions. A 0.50 caliber projectile was fired through the fuel line. After the firing it was observed that the entrance and exit openings made in the second or outer layer of resin-impregnated glass fiber windings were in the nature of clean holes corresponding to the size of the projectile. Metal flowering occurred, but it was only about half as great as is normally encountered with a conventional fuel line. Furthermore, any flowering that occurred was confined in the layer of foam material between the two layers of resin-impregnated glass fiber windings. Thus, the test results demonstrate that the fuel line of this invention possesses important advantages, as discussed hereinbefore, over conventional fuel lines.

In view of the foregoing disclosure, modifications of the present inventions may be apparent to those skilled in the art. Such modifications come within the spirit and scope of the invention.

I claim:

1. A fuel line comprising a metal tube; a first layer of a cured resin-impregnated reinforcing material in the form of a filament or yarn wound on the metal tube; a layer of a foamed plastic material covering said first layer; a second layer of a cured resin-impregnated reinforcing material in the form of a filament or yarn wound on said layer of a foamed plastic material; a layer of a self-sealing material covering said second layer of a cured resin-impregnated reinforcing material; and a layer of a protestive material, said protective material comprising windings of a fiber or tape with a protective coating applied thereto covering said layer of a self-sealing material.

2. A fuel line according to claim 1 in which the reinforcing material is selected from the group consisting of glass, quartz, carbon and graphite fibers.

3. A fuel line according to claim 2 in which the fibers are helically wound or braided onto the metal tube and onto said layer of a foamed plastic material.

4. A fuel line according to claim 2 in which the foamed plastic material is selected from the group consisting of polyvinyl chloride foam, polypropylene foam, and polyurethane foam.

5. A fuel line according to claim 4 in which the self-sealing material is a partially cured elastomer which swells upon contact with a hydrocarbon fuel.

6. A fuel line according to claim 5 in which the elastomer is selected from the group consisting of natural rubber, silicone rubber, polybutadiene and polyisoprene.

7. A fuel line according to claim 1 in which said fiber or tape is formed of nylon, rayon or asbestos and said protective coating is urethane varnish.

8. A fuel line according to claim 7 in which the metal tube is an aluminum, stainless steel or titanium tube.

* * * * *